(12) United States Patent
Fantin

(10) Patent No.: US 6,389,004 B1
(45) Date of Patent: May 14, 2002

(54) BROADBAND SERVICE DISTRIBUTION METHOD AND DEVICE

(75) Inventor: Mauro Fantin, Treviso (IT)

(73) Assignee: Telsey S.r.l., Zero Branco (IT)

( * ) Notice: Subject to any disclaimer, the term of this patent is extended or adjusted under 35 U.S.C. 154(b) by 0 days.

(21) Appl. No.: 09/084,196

(22) Filed: May 26, 1998

(30) Foreign Application Priority Data

May 26, 1997 (IT) .......................... TV97A0069
Feb. 17, 1998 (IT) .......................... TV98A0019

(51) Int. Cl.[7] .................. H04L 12/28; H04M 11/06; H04N 7/173
(52) U.S. Cl. .............. 370/351; 370/400; 375/222; 379/90.01; 725/99; 725/106; 725/111
(58) Field of Search .............. 370/389, 395, 370/400, 401, 522, 535, 351, 352, 353, 354, 431, 465; 379/90.01, 93.01, 93.09, 93.14; 375/130, 131, 219, 222; 725/74, 86, 87, 98, 99, 105, 106, 109, 110, 111, 118

(56) References Cited

U.S. PATENT DOCUMENTS 5,756,280 A * 5/1998 Soora et al. .................. 455/4.2
5,790,548 A * 8/1998 Sistanizadeh et al. ....... 370/401
5,999,612 A * 12/1999 Dunn et al. ............... 379/90.01
6,005,873 A * 12/1999 Amit .......................... 370/494
6,091,713 A * 7/2000 Lechleider et al. ......... 370/248

FOREIGN PATENT DOCUMENTS

WO 97 01244 1/1997

OTHER PUBLICATIONS

Johansson A: "VDSL–Broadband Over Copper" ISSLS. International Symposium on Subscriber Loops and Services, AU, Milsons Point, IREEA, vol. Symp. 11, Feb. 4, 1996, pp. 56–61, XP002040951 *the whole document*.
Goldberg L: "Brains and Bandwidth: Fiber Service at Copper Prices" Electronic Design, Oct. 2, 1995, XP000550493 *the whole document*.

* cited by examiner

Primary Examiner—Alpus H. Hsu
(74) Attorney, Agent, or Firm—Guido Modiano; Albert Josif; Daniel O'Byrne

(57) ABSTRACT

A method for distributing broadband services which essentially provides for separating the broadband front end of a receiver from the rest of the circuit and placing it in the fiber node or in the utility closets of a building with connection to the coaxial cable; the front end is then connected to an ADSL modem or to a modulator or to an amplifier and the signal is transferred to an adder; the two signals are then carried, over the existing telephone wire pair, to an individual end user, where the signals are split to the telephone and to the television set.

8 Claims, 6 Drawing Sheets

BROADBAND SERVICE DISTRIBUTION METHOD AND DEVICE

BACKGROUND OF THE INVENTION

The present invention relates to a broadband service distribution method.

Modern telecommunications systems currently carry, in addition to ordinary voice calls, other services for users, including the transmission of television pictures and programming, such as cable television and data transmission services such as the well-known Internet.

The passband per user required to carry these services is far greater than the band required to carry ordinary telephony.

Accordingly, telecommunications companies are developing and installing so-called "broadband access networks".

These specialized networks are designed to carry digital signals to users, characterized by very wide passbands in the directions from the exchange to the user and with narrow bands in the opposite direction.

This is due to the fact that user requests occupy a small amount of band in comparison with the large amount of information downloaded to the user.

The broadband access network is usually constituted in a hybrid, i.e. mixed, manner by a fiber-optic part and by a coaxial-cable part and is accordingly termed "Hybrid Fiber Coaxial (HFC) network".

Accordingly, FIG. 1 illustrates an exemplifying diagram in which the optical part is used to carry signals from one location, designated by the reference numeral 1 and termed "head end", where the various programs to be fed into the broadband network are concentrated, to a point, designated by the reference numeral 2 and termed "fiber node", of the broadband network implemented with the hybrid fiber coaxial (HFC) network system, in which the optical signal that arrives from the fiber is converted into an electrical signal for transmission over coaxial cable.

The coaxial cables 4 used to distribute the signal to the users branch out from the fiber node 2, which is located proximate to the users, generally designated by the reference numeral 3.

Inside the building, and starting from the so-called "network termination" (NT), designated by the reference numeral 5, the coaxial cable 4 branches out, by means of a distribution system designated by the reference numeral 6, towards the individual users, designated by the reference numerals 7.

Special equipment is required, however, to receive the services: in the case of digital cable television, a special receiver is used which is capable of performing the following operations: tuning to a channel typically in the band between 47 and 862 MHz; decrypting the signal (in the case of pay channels); decompressing the signal according to the MPEG2 standard; and sending it to the television set, designated by the reference numeral 8, in the standard PAL format.

The above-described distribution system known as Hybrid Fiber Coaxial (HFC) network is used extensively because it is a solution having a good price/performance ratio.

This system, however, entails many drawbacks, including mainly the laying of coaxial cables inside buildings and along city streets.

Particularly in urban areas and in older buildings, laying said cables entails demolition and restoration work which is particularly expensive and sometimes altogether unacceptable for users.

In FIG. 1, the expression "distribution node" references the point of access to the broadband network for channels arriving from a plurality of head ends and at the same time the point of distribution of all the transmission channels towards the users.

As a partial solution to these drawbacks, which are worsened by the extent to which they force the user of the service to perform unwanted structural work, it is known, in order to transmit broadband signals efficiently and inexpensively, to use different systems, including the one known generically by the name "broadband asymmetric transmission system" or Asymmetric Digital Subscriber Loop (ADSL) or similar systems termed XDSL, where the letter X must be replaced in each case with the technology being used.

The expression ADSL designates a broadband transmission system capable of using the conventional telephone wire pair, designated by the reference numeral 9, to carry broadband digital channels simultaneously with the ordinary telephone service, also allowing communication between the user and the head end by means of a return channel (upstream channel) at low speed (differently from the downstream channel, which operates at high speed, hence he term "asymmetric").

The ADSL broadband asymmetric transmission system thus uses the ordinary wire pair, which currently reaches every home, to carry a broadband channel over said wire pair.

This ADSL broadband asymmetric transmission system preserves the ordinary service that can be used with a telephone set, designated by the reference numeral 10, and allows the user to request the chosen program or service from the service exchange by means of the upstream channel.

The exchange 50, however, must be capable of supplying the programs on demand and individually to each user: this type of service is known as Video On Demand (VOD) and entails the presence, in the exchange, of power and accordingly expensive equipment known as "video servers", capable of serving the requests of users, or of equally expensive switching systems which typically use ATM (Asynchronous Transfer Mode) technology.

Substantially, the video server is a powerful computer capable of transmitting programs and services to users at the user's request, while the ATM switch alternatively switches the requested channel towards the user.

Accordingly, any use of the ADSL broadband asymmetric transmission system configures the network as point-to-point, as shown schematically in the accompanying FIG. 2, between the exchange and the user, differently from the above-mentioned distribution structure known as hybrid fiber coaxial (HFC) network, in which the network gradually branches out from the exchange or head end to the users.

The ADSL broadband asymmetric transmission system therefore connects the user to broadband services only with a channel at a maximum rate of 8 Mbit/s and uses the existing wire pair, sharing it with the basic telephone services. This structure, however, entails very expensive equipment and a radical change in distribution concept.

SUMMARY OF THE INVENTION

The aim of the present invention is to solve the described technical problems, eliminating the drawbacks of the cited prior art and thus by providing a solution which allows to eliminate the costs and inconveniences of coaxial-cable wiring for the user.

Within the scope of this aim, an important object of the present invention is to provide a solution in which the end user does not have to perform any specific work at the masonry level in his home in order to utilize the broadband service.

Another important object of the present invention is to provide a solution which entails low implementation costs for the distribution of the broadband service.

Another important object of the present invention is to provide a solution which does not require the use of very expensive equipment such as powerful computers capable of serving the user's requests.

This aim, these objects and others which will become apparent hereinafter, are achieved by a method for distributing broadband services characterized in that it provides for:

separating a broadband front end of a receiver from other portions of the circuit;

placing said front end in utility closets of a building;

connecting said front end to a so-called "modulator-demodulator" (ADSL modem) or to a so-called "modulator" or to an amplifier;

transferring a signal from said modulator-demodulator (ADSL modem) and from a telephone exchange to an adder or transferring the signal from said "modulator" or amplifier to an adder in order to mix the broadband and telephone services;

transferring the signals over a telephone wire pair to an individual end user; and splitting the signals to a telephone and to a television set.

BRIEF DESCRIPTION OF THE DRAWINGS

Further characteristics and advantages of the invention will become apparent from the following detailed description of a particular embodiment thereof, illustrated only by way of non-limitative example in the accompanying drawings, wherein.

DESCRIPTION OF THE PREFERRED EMBODIMENTS

Figure 1:
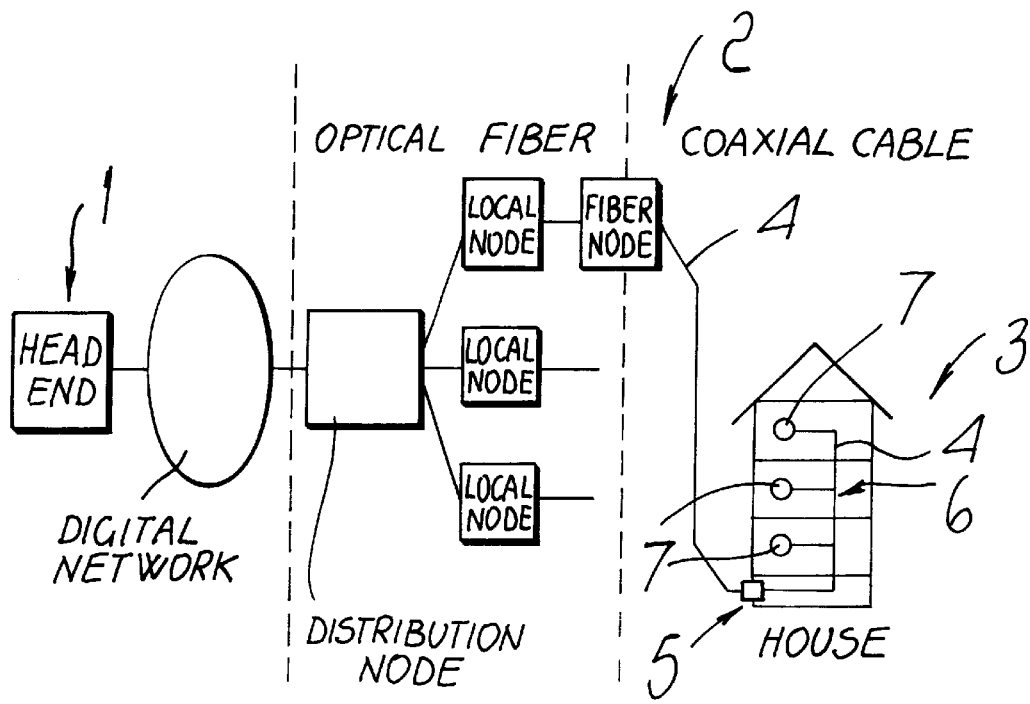
FIG. 1 is a diagram of a prior art arrangement.
Figure 2:
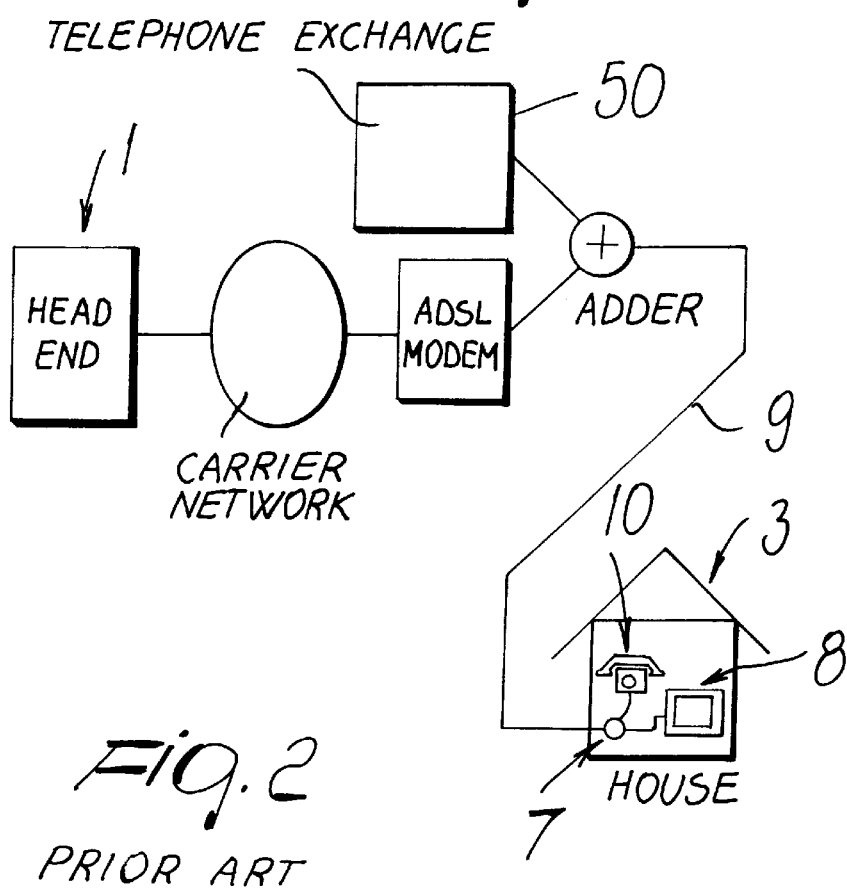
FIG. 2 is another diagram of another prior art arrangement.
Figure 3:
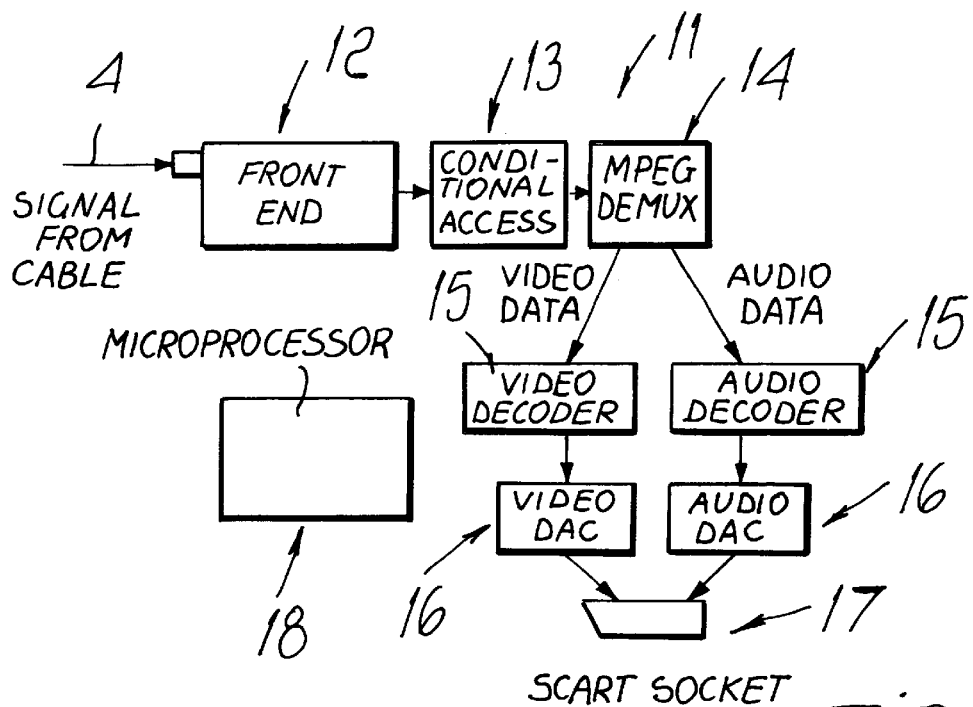
FIG. 3 is a block diagram of the structure of a digital receiver.

The structure of a digital receiver (see FIG. 3), generally designated by the reference numeral 11, for broadband services is described with reference to the above figures, and particularly with reference to FIG. 3, in order to improve the comprehension of the method according to the invention. The receiver comprises a block, designated by the reference numeral 12, which is termed "front end" and is constituted by an electronic module which collects the signals 4 arriving from the network and processes them appropriately by tuning and conditioning them so that they become usable by the subsequent stages of the receiver.

Substantially, the front end 12 has the purpose of selecting the selected channel within the band available to the user: the front end 12 also converts the received signal 4 into a plurality of data which are then processed by the other subsequent stages.

The reference numeral 13 designates a block, termed "conditional access", which is a system that allows access to services, for example the viewing of a television channel, only to authorized users (for example to those who pay a subscription), preventing use by unauthorized users by means of transmission encryption methods.

The reference numeral 14 designates a block conventionally termed "Mpeg demux", which is constituted by a system for the digital encoding and compression of video signals which, by means of appropriate decoders 15 (video and audio decoders) and digital to analog converters (DAC) 16, carry the signals to a SCART socket 17, the entire system being managed by means of a microprocessor 18.

Figure 4:
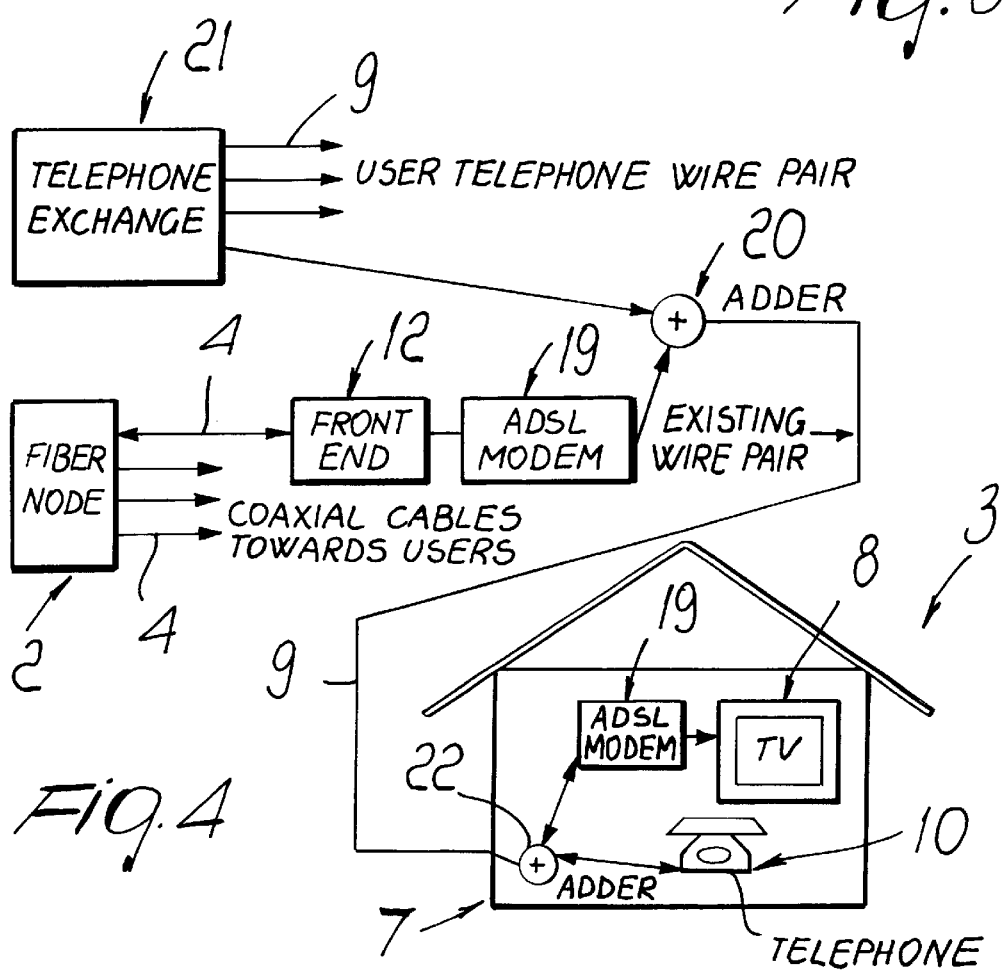
FIG. 4 is a schematic view of the device according to the present solution.

In the method, the broadband front end 12 of the receiver 11 is separated from the rest of the circuit, placing it in the fiber node 2, as shown in FIG. 4 or in the same point of the building where the wire pairs of the telephone service enter said building and therefore typically in the utility closets located in the basement of the house.

There, the front end 12 is connected to a coaxial cable 4 of the fiber node 2; in the prior art, said coaxial cable 4 would have had to reach the user directly.

The front end 12 is then connected to a modulator-demodulator (ADSL modem), designated by the reference numeral 19 (see FIG. 6), or to a modulator 23 (see FIG. 7), which in turn sends the signal to a first adder 20 which also receives a signal from a telephone exchange generally designated by the reference numeral 21.

The front end selects the channel to be received: this switching is requested by a decoder 24 over an upstream channel driven by a command transmitter 26 and interpreted and executed by a command receiver 25.

The signals are carried from the first adder 20, over the telephone wire pair 9, to a second adder or adder-splitter 22, which is located at the individual user and splits the signal, sending it to an additional modulator-demodulator (ADSL modem) 19 and then to a television set 8 and to a telephone 10; as an alternative, the signals are carried from the first adder 20, over the telephone wire pair 9, to a second adder-splitter 22 which is located at the individual user and splits the signal, sending it to a telephone 10 and to a demodulator 39 which is located inside the decoder 24 and then to a television set 8.

The method for transmitting the signals from the first adder to the second adder over the telephone wire pair 9 may be the most convenient and therefore may use the following systems:

a transmission technology using a 'broadband asymmetric transmission system' (ADSL), which splits the information to be transmitted into a large number of small packets to be transmitted (ADSL DMT or Discrete Multi Tone);

an alternative transmission technology using a 'broadband asymmetric transmission system' (ADSL) (ADSL CAP or Carrierless Amplitude Modulation);

a modulation system used for digital transmission over broadband cable networks (ADSL QAM or Quadrature Amplitude Modulation);

a system that differs from the 'broadband asymmetric transmission system' (ADSL) in that it provides symmetrical communication in the upstream and downstream channels (HDSL or High Speed Digital Subscriber Loop);

a system which differs from the preceding one in terms of a higher transmission rate (VDSL or Very High Speed Digital Subscriber Loop);

wireless transmission at radio frequencies (narrowband wireless);

transmission with methods known as "spread-spectrum".

The illustrated solutions therefore allow to achieve all the advantages that can be individually ascribed to known technology without requiring interventions such as the addition of further cables, wiring and masonry work, with consequent cost reductions and elimination of the previously mentioned inconveniences.

Figure 5:
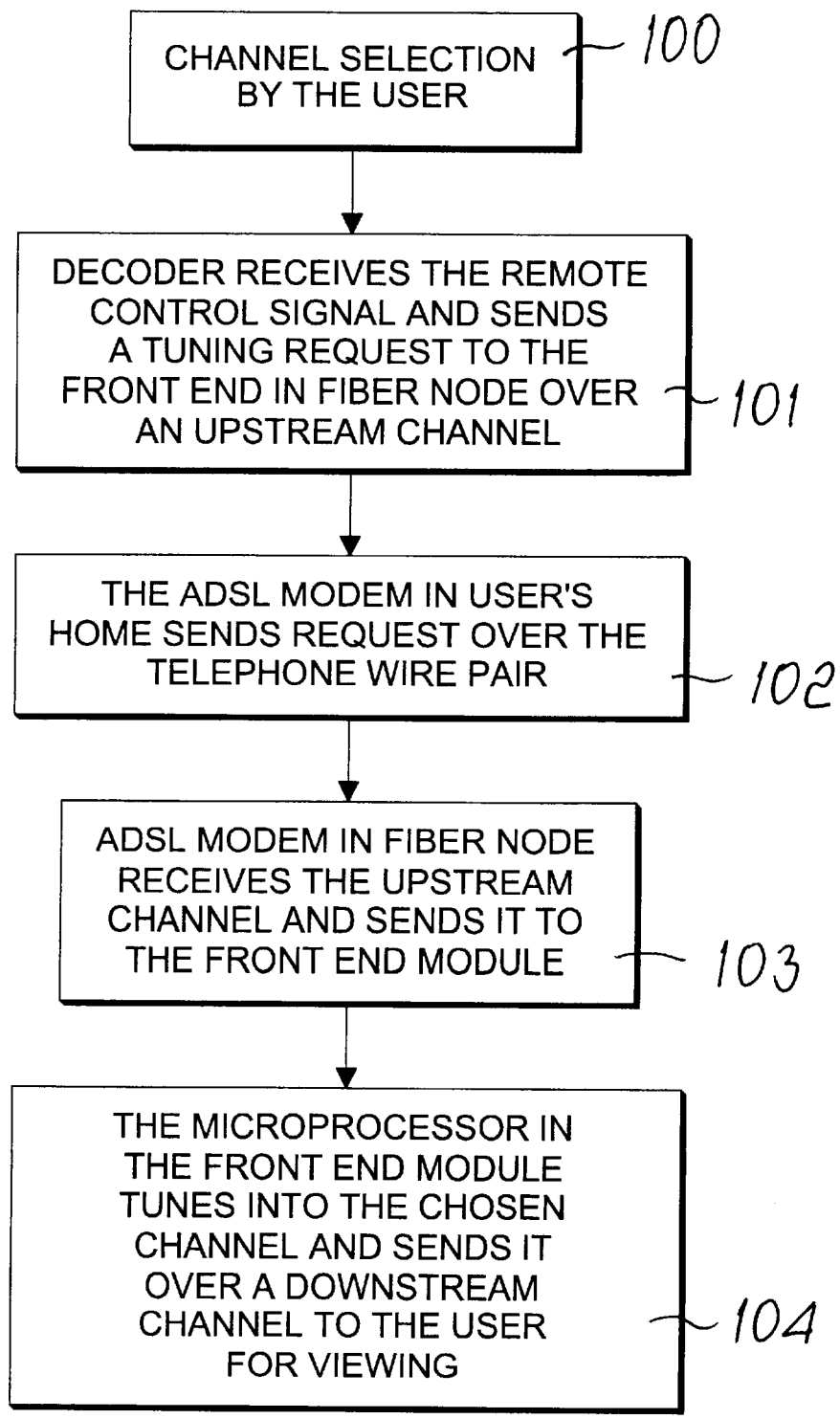
FIG. 5 is a block diagram of an indication of a possible mode of operation.

FIG. 5 is a block diagram of an indication of a possible method of operation. The user selects a channel with remote control of decoder (step 100). The decoder receives signal of remote control and sends a tuning request to the front end in fiber node over an upstream channel (step 101). The ADSL modem in user's home sends request over the telephone wire pair and simultaneously ensures normal telephone service (step 102). The ADSL modem in fiber mode receives the upstream channel and sends it to the front end module (step 103). The microprocessor in front end module tunes into the chosen channel and sends it over a downstream channel to the user for viewing (step 104).

Figure 6:
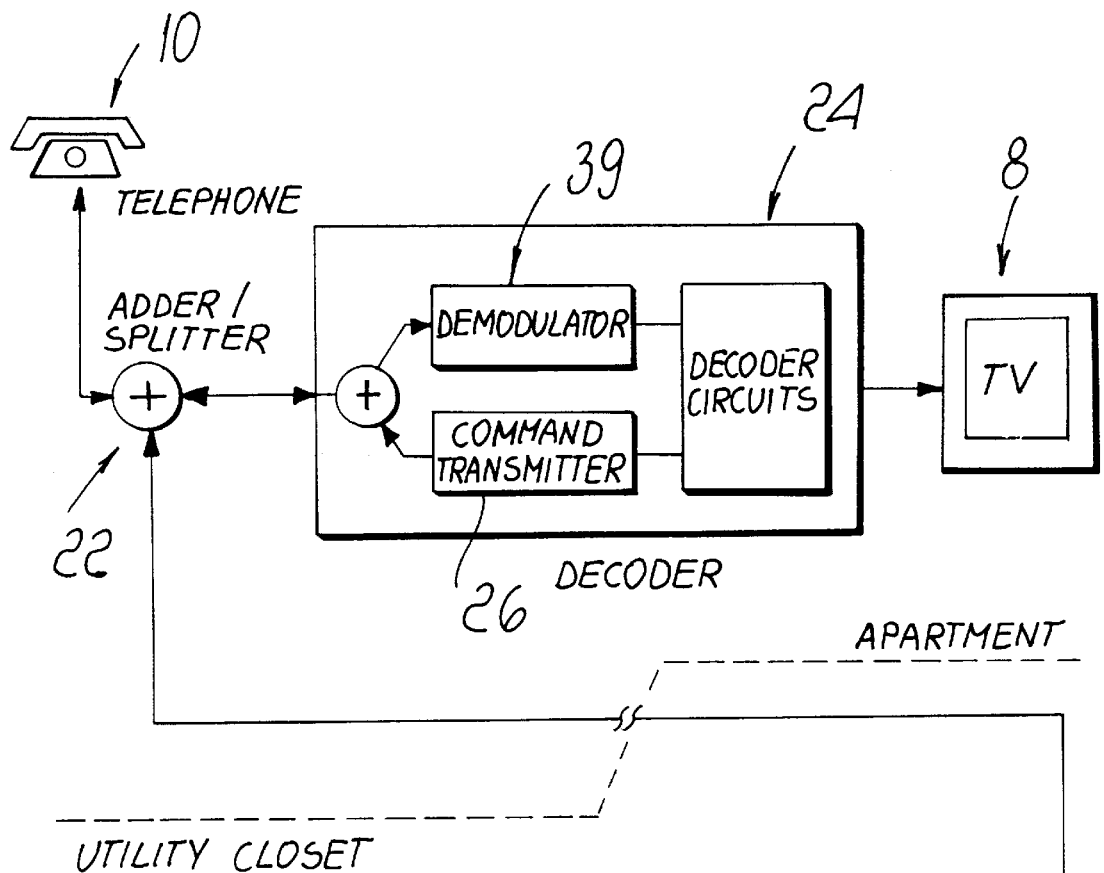
FIG. 6 is a schematic view of the device according to the present invention, using the modulator in the utility closet of the house.
Figure 6:
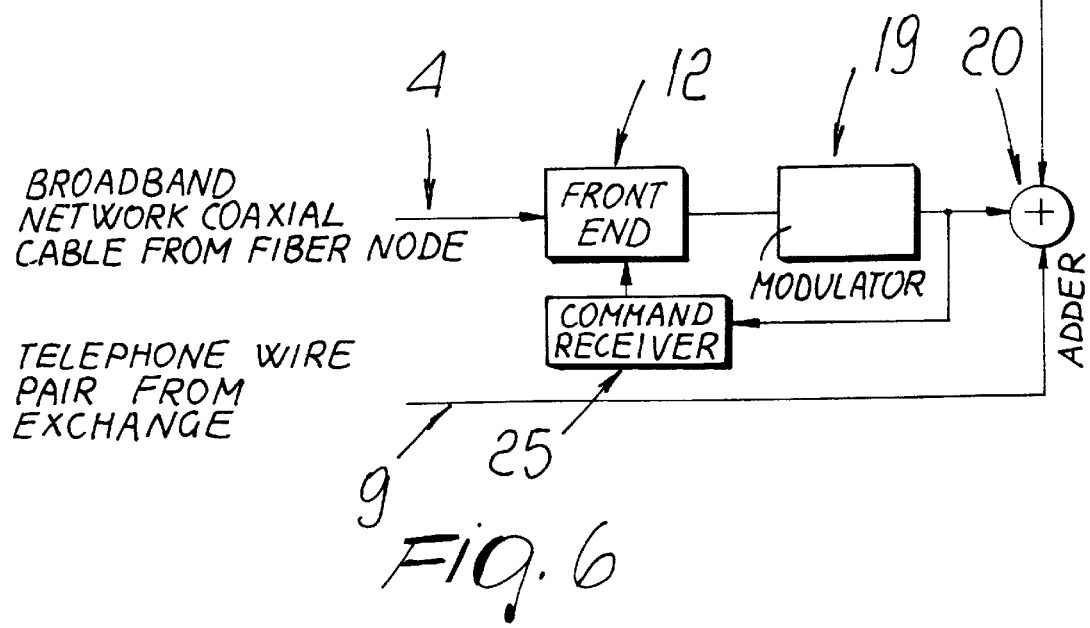
Figure 7:
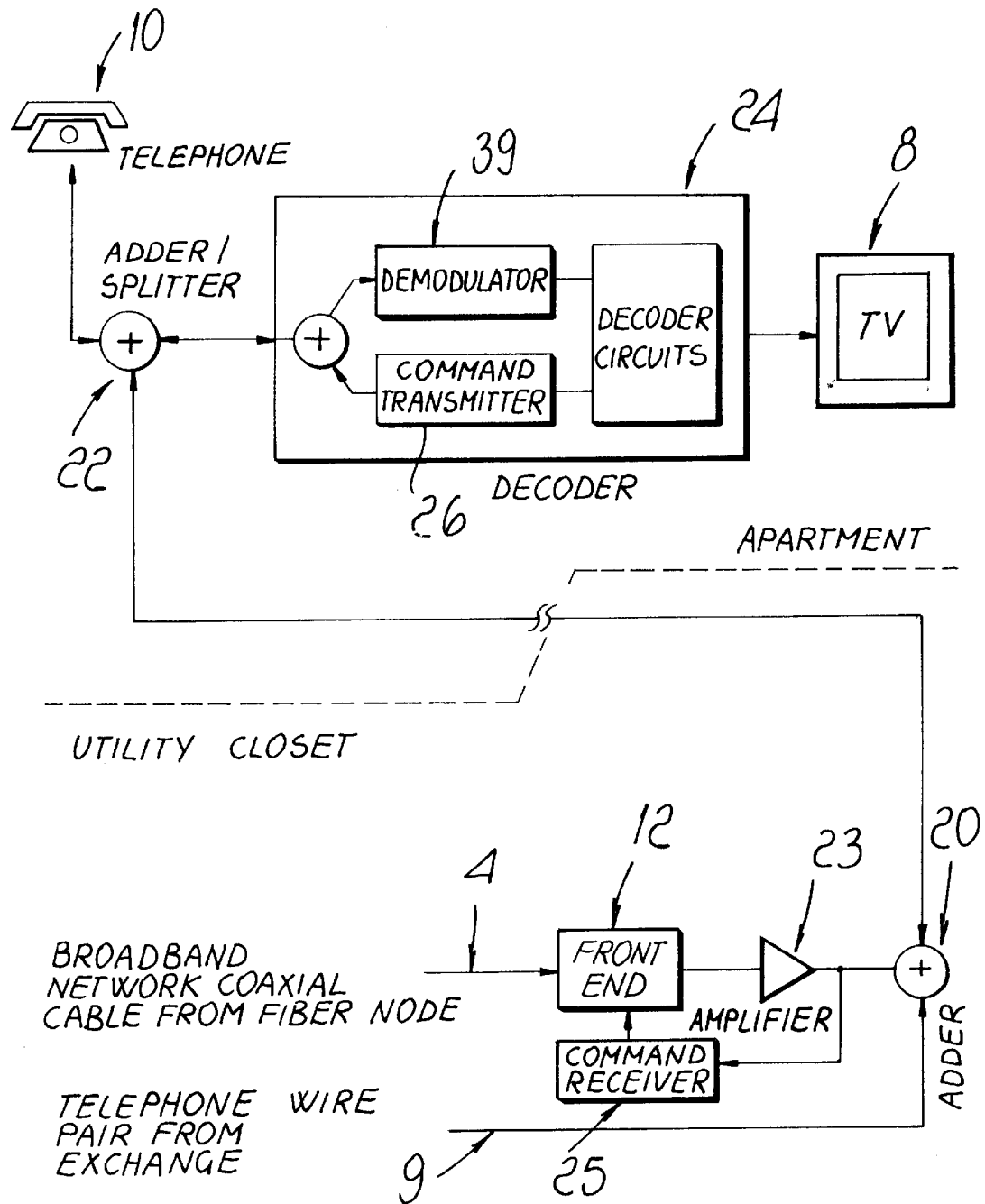
FIG. 7 is a schematic view of the device according to the present invention, without using the modulator.

FIGS. 6 and 7 are block diagrams of the device of the present invention.

Figure 8:
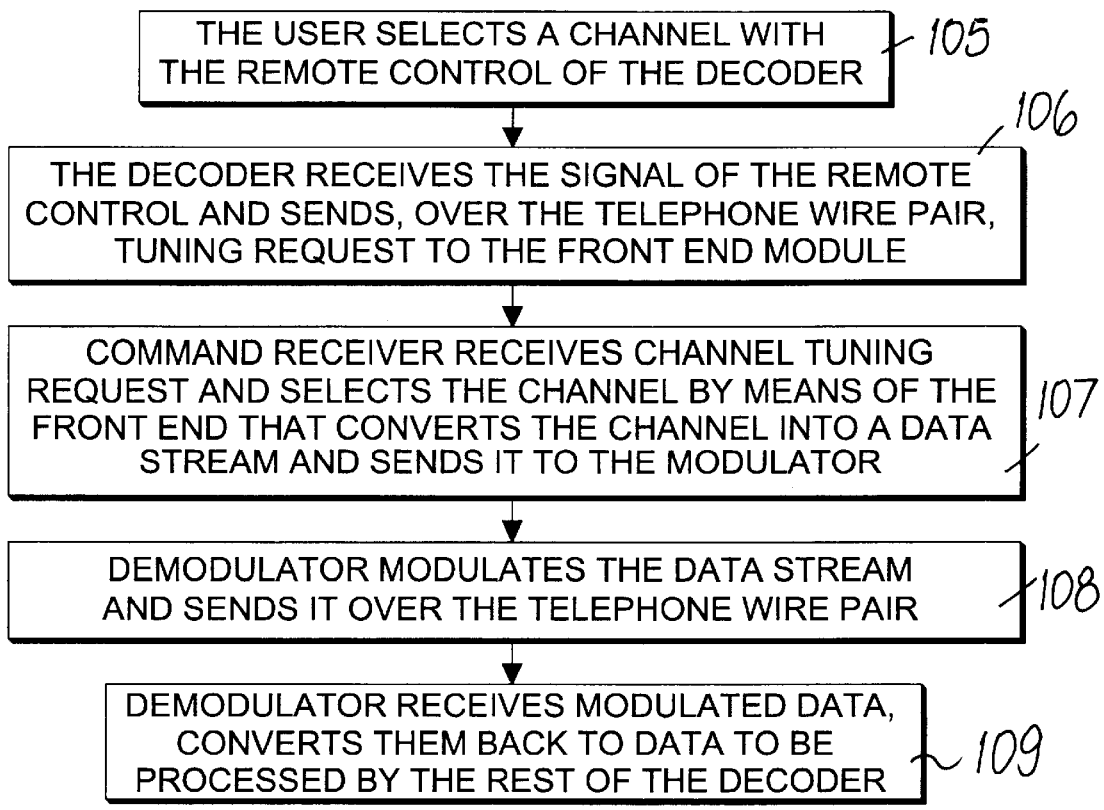
FIG. 8 is a block diagram of an indication of a possible operation with a modulator, as shown in the diagram of FIG. 6.
Figure 9:
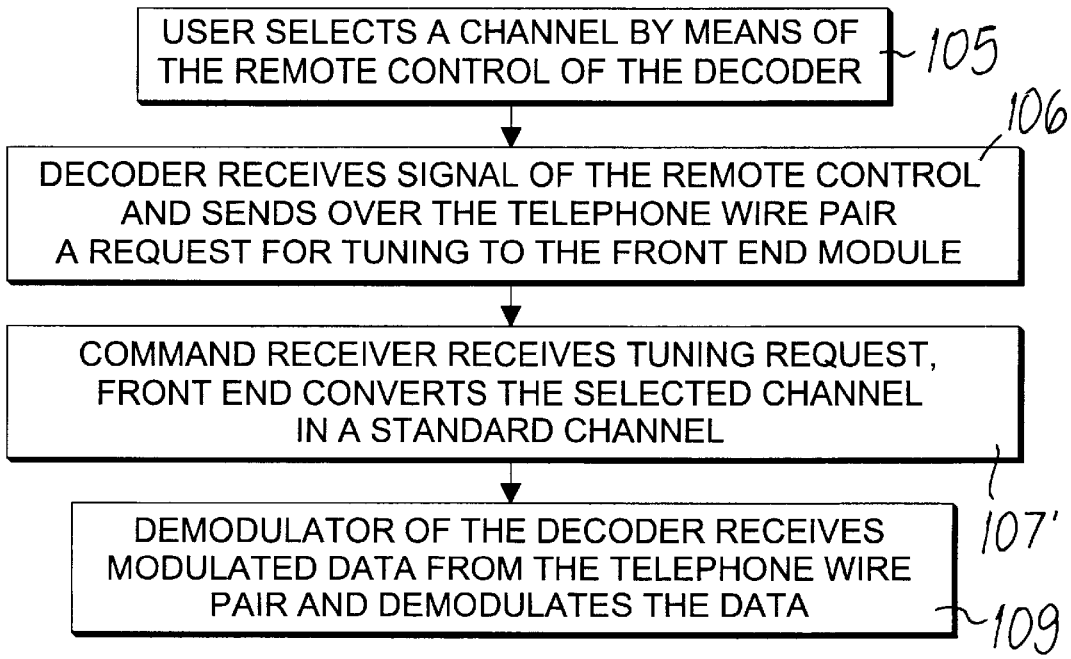
FIG. 9 is a block diagram of an indication of a possible operation without a modulator, as shown in the diagram of FIG. 7.

FIGS. 8 and 9 are flow charts of further possible methods of operation. The user selects a channel with remote control of decoder (step 105). The decoder receives the signal of remote control and uses command transmitter to transmit, over the telephone wire pair, tuning request to the front end module located either proximate to fiber node or in basement closets (for example basements or meter closets) (step 106). The command receiver receives the channel tuning request and selects the channel by means of the front end. The front end converts the channel into data stream and sends it to the modulator (step 107). The modulator modulates the data stream and sends it over the telephone wire pair (step 108). The demodulator module located in the decoder receives modulated data from the wire pair and converts them back to data which are processed by the rest of the decoder until display of picture on television set is achieved (step 109).

The method shown in FIG. 9 instead provides for the following steps. The user selects a channel with remote control of the decoder (step 105). The decoder receives signal of the remote control and uses command transmitter to transmit, over the telephone wire pair, tuning request to the front end module located either proximate to fiber node or in basement closets (for example basements or meter closets) (step 106). The command receiver receives the channel tuning request and selects the channel by means of the front end. The front end converts the channel into a standard fixed-frequency channel without altering its modulation and sends it over the telephone wire pair after amplification (step 107). The demodulator module located in the decoder receives modulated data from the wire pair and converts them back to data which are processed by the rest of the decoder until display of picture on television set is achieved (step 111).

It has thus been observed that the illustrated method has achieved all of the intended aim and objects, since it is possible to distribute broadband services to the various users, eliminating the costs and inconveniences of laying coaxial-cable to reach the user.

Attention is also drawn to the fact that the switching system located in the utility closets of the building can be controlled, for example, by means of a conventional telephone modem which is included by the service provider, so as to enable or disable the supply of the service, and thus becomes the system for conditional access to the service.

It is noted that the switching system according to the present method can be supplied by various power sources, such as electric mains power, over the coaxial cable of the broadband network, by means of the telephone wire pair of the telephone system, by means of the set-top box (decoder) using the wire pair section that connects the set-top box to the switching system.

The present invention is of course susceptible of numerous modifications and variations, all of which are within the scope of the same inventive concept.

For example, the front end 12 might directly accept a fiber-optic input, avoiding optoelectrical conversion at the fiber node side, with an additional economical advantage.

The materials and the dimensions that constitute the individual components used in the illustrated solutions, as well as the method for transmitting the signals to the second adder, may of course also be the most pertinent according to specific requirements.

What is claimed is:

1. A method for distributing broadband services, comprising the steps of:

separating a broadband front end of a receiver from other portions of a circuit of the receiver;

placing said front end in utility closets of a building;

connecting said front end to a modulator-demodulator or to a modulator or to an amplifier;

transferring a signal from said modulator-demodulator and a signal from a telephone exchange to an adder or transferring the signal from a modulator or amplifier and the signal from the telephone exchange to the adder in order to mix the broadband and telephone services;

transferring a signal, output by the adder, over a telephone wire pair to an individual end user;

splitting the signal output by the adder to a telephone and to a television set; said front end selecting a channel to be received, said selection being requested by a decoder over an upstream channel driven by a command transmitter and being interpreted and executed by a command receiver.

2. The method according to claim 1, wherein said broadband front end of said receiver is located In a fiber node and to a point of a broadband hybrid fiber-coaxial network where an optical signal arriving from the fiber is converted into an electrical signal for transmission on coaxial cable.

3. The method according to claim 2, wherein said front end is connected to the coaxial cable of said fiber node.

4. The method according to claim 1, wherein the signal output by said adder is carried from said adder over the telephone wire pair to a splitter located at an individual user, said splitter splitting the signal and transferring said signal to a further modulator-demodulator and then to the television set and to the telephone.

5. The method according to claim 1, wherein said broadband front end of said receiver is located in a chosen point of a house reached by the telephone wire pair.

6. The method according to claim 1, wherein said command receiver allows implementation of data from a telephone network so as to also act as a system for conditional access to the broadband network.

7. The method according to claim 4, wherein said splitter is located at the individual user, said splitter splitting the signal and transferring said signal to a demodulator which is located inside said decoder and then to the television set.

8. The method according to claim 7, wherein the transmission of the signal between said adder and said splitter over said telephone wire pair is performed using a spread spectrum technique.

* * * * *